United States Patent [19]
Hosotani

[11] Patent Number: 5,367,317
[45] Date of Patent: Nov. 22, 1994

[54] SCREEN DISPLAY DEVICE
[75] Inventor: Osamu Hosotani, Hyogo, Japan
[73] Assignee: Mitsubishi Denki Kabushiki Kaisha, Japan
[21] Appl. No.: 78,127
[22] Filed: Jun. 16, 1993
[30] Foreign Application Priority Data
  Oct. 21, 1992 [JP] Japan .................. 4-307690
[51] Int. Cl.5 ............................................ G09G 1/02
[52] U.S. Cl. ................................. 345/193; 345/190; 345/200
[58] Field of Search ...................... 345/200, 190, 193
[56] References Cited
  U.S. PATENT DOCUMENTS
  4,845,661 7/1989 Shimada ...................... 345/200
  5,113,180 5/1992 Gupta et al. ................ 345/190

Primary Examiner—Alvin E. Oberley
Assistant Examiner—Vivian Chang
Attorney, Agent, or Firm—Townsend and Townsend Khourie and Crew

[57] ABSTRACT

A screen display device is provided with address decoder 15, address generator 16, address translation circuit 17, data buffer 18 and data translation circuit 19 and is designed to reduce a rewrite operation time by rewriting data with a plurality of addresses of display memory 4 to the same data by the instruction of CPU 1. Further, it is possible to perform rewriting of the display characters, i.e. rewriting of display memory data efficiently and at a high speed.

6 Claims, 10 Drawing Sheets

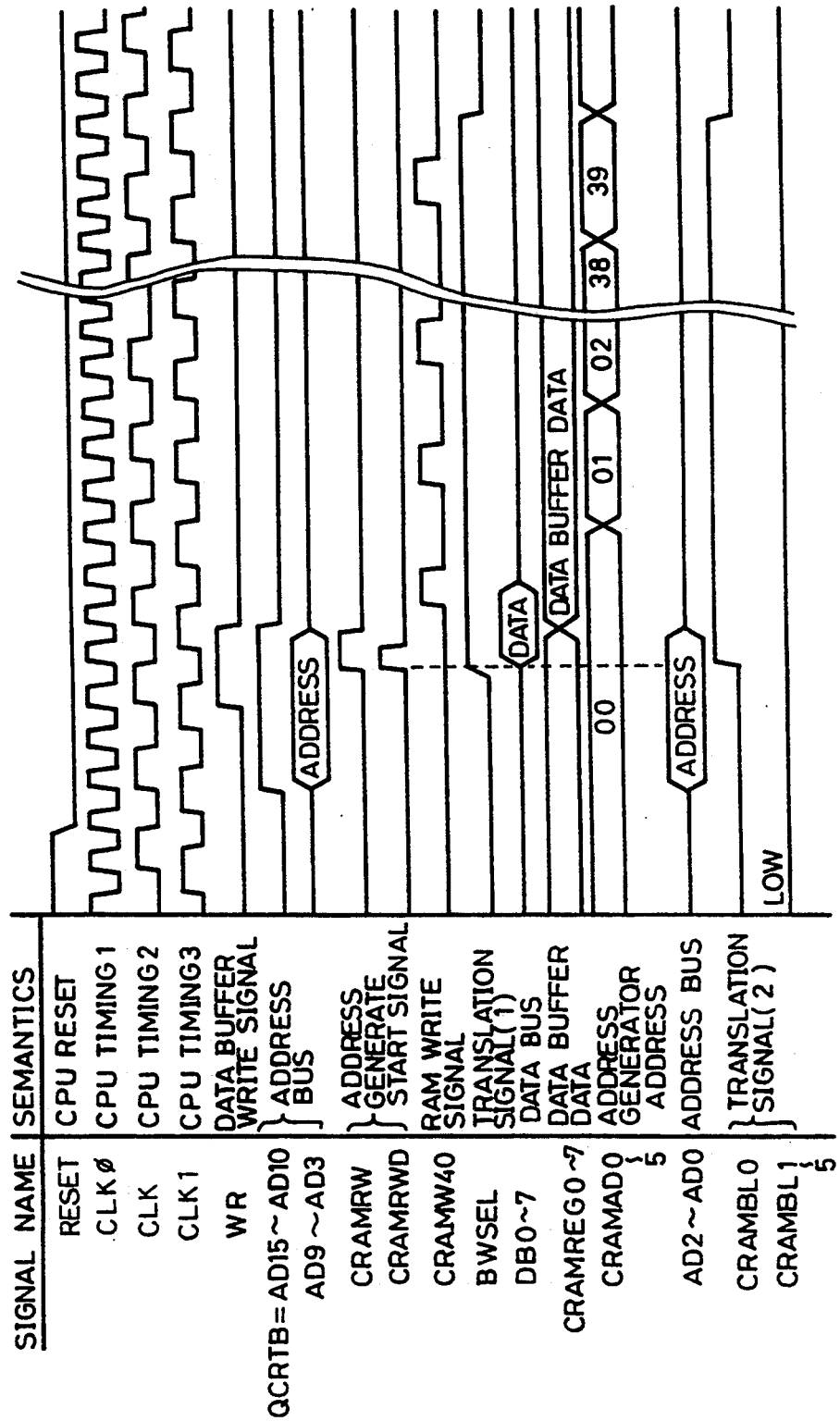
FIG. 7 TIMING CHART (40 BYTES BLOCK REWRITE)

FIG. 8

| BLOCK REWRITE ADDRESS | REWRITING DISPLAY MEMORY ADDRESS | MEMORY CONTENT | |
|---|---|---|---|
| $2200_{16}$ ADDRESS | $2000_{16}$ ADDRESS ~ $2027_{16}$ ADDRESS | BLOCK 1 | CHARACTER CODE |
| $2201_{16}$ ADDRESS | $2040_{16}$ ADDRESS ~ $2067_{16}$ ADDRESS | BLOCK 2 | CHARACTER CODE |
| $2202_{16}$ ADDRESS | $2080_{16}$ ADDRESS ~ $20A7_{16}$ ADDRESS | BLOCK 3 | CHARACTER CODE |
| $2203_{16}$ ADDRESS | $20C0_{16}$ ADDRESS ~ $20E7_{16}$ ADDRESS | BLOCK 1 | COLOR CODE |
| $2204_{16}$ ADDRESS | $2100_{16}$ ADDRESS ~ $2127_{16}$ ADDRESS | BLOCK 2 | COLOR CODE |
| $2205_{16}$ ADDRESS | $2140_{16}$ ADDRESS ~ $2167_{16}$ ADDRESS | BLOCK 3 | COLOR CODE |

SCREEN DISPLAY REWRITE EXAMPLE

WHEN IT IS REQUIRED TO HAVE THE SAME OR SIMILAR CHARACTERS FOR A ROW

ALL CHARACTERS TO BE THE SAME COLORS

EACH CHARACTER IS DIFFERENT IN COLOR

SCREEN DISPLAY DEVICE

BACKGROUND OF THE INVENTION

1. Field of the Invention

This invention relates to a screen display device for displaying characters or patterns, such as a selected channel number, sound volume, or menu function (hereinafter collectively called "characters") on a TV screen.

2. Description of the Prior Art

FIG. 9 is a block diagram illustrating a configuration of a conventional screen display device. This screen display device is, for example, designed to have a display of 40 characters×3 lines on a single display screen. In FIG. 9, reference numeral 1 is a CPU (Central Processing Unit: processor), numeral 2 is an address bus and numural 3 is a data bus. Numeral 4 denotes a display memory in which code and display color data for each character or pattern to be displayed on a TV screen is stored and data is rewritten by the instruction of the CPU 1 and it is composed of RAM (Random Access Memory). Numerals 5 to 8 are circuits appendant to the display memory 4 which comprise: a first address decoder 5 which decodes an address signal outputted via the address bus 2 from the CPU 1, outputs the decoding result to the display memory 4 and designates a write address of the display memory 4: a write circuit for writing data (a given bit number of character code and color data) outputted via data bus 3 from the CPU 1 into an area shown by the write address which was designated by said first address decoder 5; a second address decoder 7 which decodes an address from a video signal output circuit 10 described below and designates a read address of the display memory 4: and a read circuit 8 for reading out data from the address designated by said second address decoder 7. Numeral 9 is a font memory composed of ROM (Read Only Memory) which prestores font data of characters or patterns to be displayed on the screen and from which the corresponding font data is read out in response to the character code read out from said display memory 4. A video signal output circuit is designated by numeral 10 and it reads out in sequence the data stored in said display memory 4 from a top of the address and outputs the data outputted from the font memory 9, i.e. font data, as video signal in accordance with the scanning line of a TV screen. The font data and the color data from the display memory 4 are inputted to the video signal output circuit and further a vertical synchronizing signal (VSYNC) from a terminal 11, a horizontal synchronizing signal (HSYNC) from a terminal 12 and a clock from a display oscillation circuit 13 are respectively inputted thereto and, based on these inputs, the font data is outputted as video signal to an output terminal of color signal output terminals 14 of R, G and B designated by the color data.

Then, the operation of the conventional device will be explained below. At first, character code and color data to be displayed on the TV screen are written to a display memory 4 by a program executable by a CPU 1. An addresss of the display memory 4 is outputted from CPU 1 to an address decoder 5 via an address bus 2 and data is outputted from CPU 1 to a write circuit 6 via a data bus 3.

When the character code having characters of 40 characters×3 lines, i.e. 120 characters (for example, 256 kinds of characters can be displayed for a character code of 8 bits) and color data (for example, 8 colors of display are possible for 3 bits of 1 bit each for R, G and B) are displayed on a single TV screen, as they have a one-to-one correspondence, it is necessary to write data to at least 120 bytes of the display memory 4 by the relation of one byte per one character in order to designate character code and color data corresponding to the single screen. As one byte of display memory 4 is accessed by one instruction executed by CPU 1, it is necessary for CPU 1 to execute 120 instructions in order to access all the data corresponding to 120 bytes. In this case, if total bit number for the character code and the color data is within 8 bits, it is possible to store one byte (8 bits) in one address by using CPU 1 of 8-bit bus configuration so that the character code and color data can be stored in the same address of the display memory 4. On the contrary, if the total bit number for the character code and color data is over 8 bits, they are respectively stored in the separate addresses of the display memory 4 and this means that write and read are controlled accordingly.

When setting of the character code and color data to the display memory 4 is completed by the execution of instruction of CPU 1, then the video signal output circuit 10 is formatted to start read-out from the top address of the display memory 4 by the vertical synchronizing signal (VSYNC) inputted via a terminal 11 from a synchronizing signal generation circuit of a TV. Further, a read-out address is supplied from the video signal output circuit 10 to the second address decoder 7 of the display memory 4 in synchronism with a horizontal scanning cycle of the horizontal synchronizing signal (HSYNC) from a terminal 12 and a clock of a display oscillation circuit 13, and the decoded result from the second address decoder 7 is supplied as the address of the display memory 4. The character code and color data previously set to the display memory 4 are read out in sequence in a character unit from a top of the address of the read circuit 8 according to the decoding result from the second address decoder 7. The read out color data is direct supplied to the video signal output circuit 10 to designate the R, G or B terminal of the color signal output terminals 14, but the character code is then supplied as the address of the font memory 9 and the data corresponding thereto, i.e. the font data previously written into the font memory 9 is read out and then inputted into the video signal output circuit 10. The video signal output circuit 10 synchronizes the font data with the horizontal synchronizing signal (HSYNC) from the terminal 12 and outputs the data in series, i.e. in sequence by one bit at a time from the color signal output terminals 14 corresponding to the color data previously read out, by the clock of the display oscillation circuit 13. The operation after the data is set in the display memory 4 is repeatedly performed in response to each vertical synchronizing signal (VSYNC) from the terminal 11 and as a result, the desired characters or patterns are displayed on the TV screen.

In such a conventional screen display device, as shown in FIG. 10(a) where all characters to be displayed on the screen are rewrited to be the same for one full line (includes the case where one blank line is made, i.e. a line is totally erased: see a first and second lines in this figure), where most characters are rewritten to have the same ones for a line except some (see a third line), or even in the case where characters in different colors are required to have the same colors as seen in FIG. 10(b), it has been necessary to access and rewrite all addresses of the display memory 4 corresponding to the characters to be displayed on the screen and further necessary for CPU to execute the number of instructions in response to the number of that access. Accordingly, the conventional screen device has problems in that too much load must be put on the software, a longer time is required to execute all the instructions and rewriting of the display characters are not efficiently performed.

SUMMARY OF THE INVENTION

Accordingly, an object of the present invention is to provide an improved screen display device which can rewrite data with a plurality of addresses of a display memory corresponding to one line on a screen to be the same data in a short time and efficiently rewrite display characters on the screen in order to solve the problems described above.

According to the present invention, there is provided a screen display device comprising: a processor; a write address outputted by the instruction of the processor; a display memory: a write address control means sending the write address direct to the display memory when the write address is a normal address within an area of the display memory, sending in sequence, when the write address is a block rewrite address preset corresponding to a block of each screen display line within the area of the display memory, a plurality of addresses within the corresponding block to the display memory, and making the translation signal go active during that time: and a write data control means temporarily storing the write data outputted by the instruction of the processor, sending the write data direct to the display memory when the translation signal goes inactive and sending, when the translation signal goes active, the temporarily stored data to the display memory.

According to the present invention, a plurality of bytes of the display memory corresponding to a line on the screen can be rewritten in a short time to the optional same data by conducting writing operation to the block rewrite address preset outside the display memory area by the instruction of the processor 1. With this, it is possible to efficiently rewrite the display characters.

The above and other objects, features and advantages of the Invention will become more apparent from the following description when taken in conjunction with the accompanying drawings, in which:

BRIEF DESCRIPTION OF THE DRAWINGS

FIG. 7 is a timing chart illustrating an operation of the embodiments shown above;

FIG. 8 is a chart illustrating a block rewrite address in the embodiments shown above, an address of a display memory rewritable by writing to the block rewrite address and the contents thereof;

DESCRIPTION OF THE PREFERRED EMBODIMENT

Figure 1:
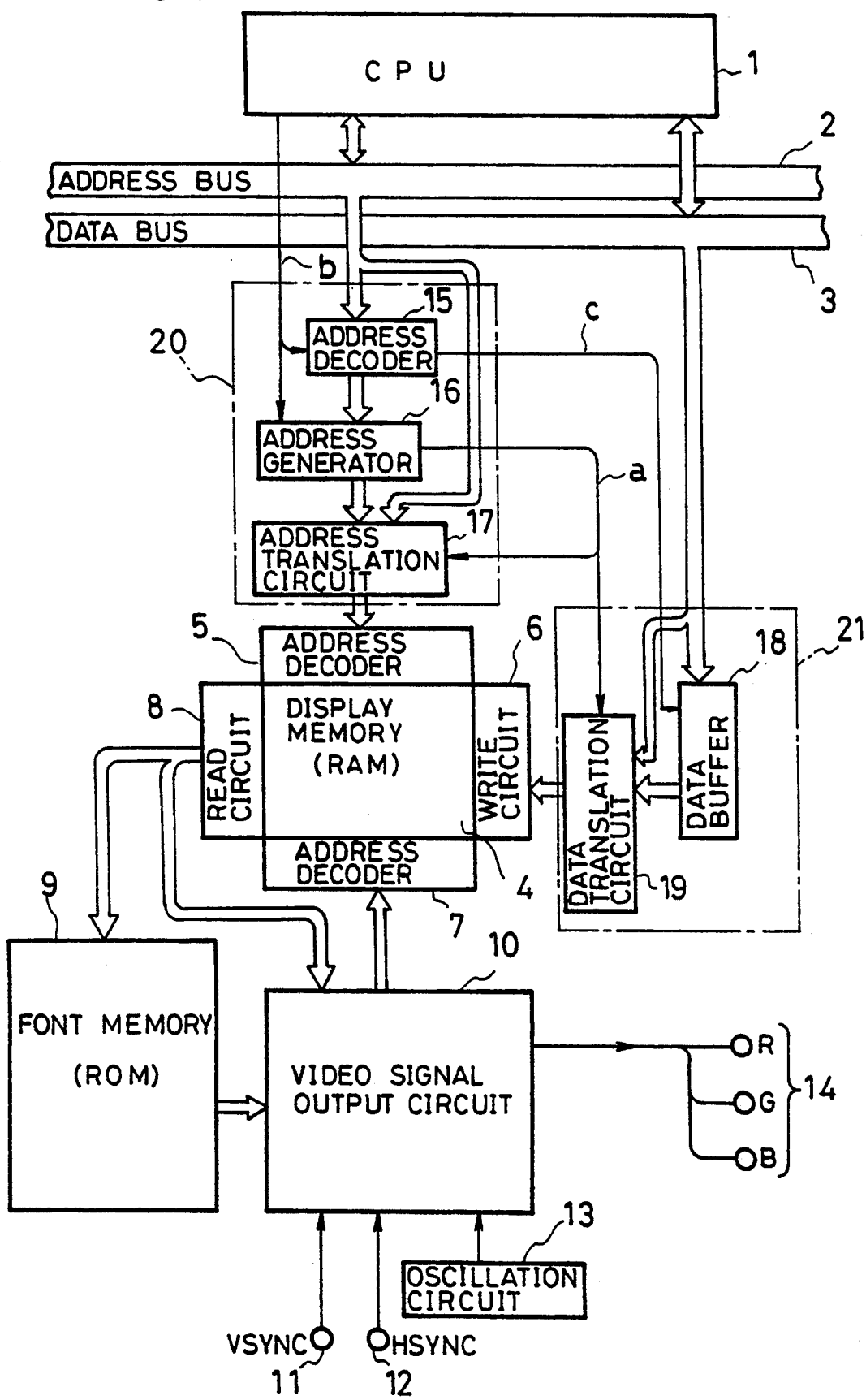
FIG. 1 is a block diagram illustrating a configuration of a screen display device according to an embodiment of the present invention.

An embodiment of the present invention will be described hereinafter with reference to the drawings. FIG. 1 is a block diagram illustrating a configuration of a screen display device according to an embodiment of the present invention. The detailed description for the blocks having the same reference numerals as the conventional screen display device described above are omitted, because they are the same or similar parts as the conventional device. Reference numeral 15 is an address decoder which decodes a write address inputted from CPU 1 via an address bus 2. Numeral 16 denotes an address generator which when the write address is a block rewrite address preset outside an area of a display memory 4 based on the decoded result from the said address decoder 15, makes a translation signal "a" controling an address translation circuit 17 and a data translation circuit 19 described below go active, generates in sequence a plurality of addresses (the ones indicating the data for a line on the screen) within the block of the display memory 4 designated in response to the said address, and during that time, holds the active state ("H" for positive logic, "L" for negative logic) of said translation signal "a". Numeral 17 is an address translation circuit which direct transfers the write address from CPU 1 to the address decoder 5 of the display memory 4 when said translation signal "a" goes inactive, and transfers the write address generated by said address generator 16 to the address decoder 5 of the display memory 4 when the translation signal "a" goes active. A write address control means 20 is composed of said address decoder 15, address generator 16 and address translation circuit 17. The block rewrite address preset outside the area of display memory 4 means the address which is specially set outside the address area within the memory to indicate, when accessed, that it is a block rewrite of a plurality of addresses within the block which divided the display memory area into each screen display line and which is not used during the normal access. A data buffer is designated at numeral 18 and temporarily stores write data from CPU 1. Designated at 19 is a data translation circuit which transfers write data from CPU 1 direct to a write circuit 6 of display memory 4 when said translation signal "a" goes inactive, and transfers data stored in data buffer 18 to write circuit 6 of display memory 4 when translation signal "a" goes active. A write data control means 21 is composed of said data buffer 18 and data translation circuit 19. A control signal "b" includes a timing signal and the like from CPU 1 to address decoder 15 and address generator 16, and a control signal "c" is one from address decoder 15 to data buffer 18.

Now, an operation will be explained below.

When it is required for character code and color data corresponding to one character to be displayed on the screen, to be written into display memory 4, the address on display memory 4 corresponding to one character to be displayed on the screen is given from CPU 1 via address bus 2 to address decoder 15 and address translation circuit 17. Then, address decoder 15 decodes that address and transfers the result to address generator 16.

The address generator 16 does not generate address, based on the decode result, because said address is one on the display memory 4 and is rewrite of each character, and does not output write address to address translation circuit 17. Further, the translation signal "a" to address translation circuit 17 and data translation circuit 19 remains inactive. Accordingly, address translation circuit 17 selects address inputted direct from address bus 2 and transfers it to address decoder 5 display memory 4. Furthermore, data outputted from CPU 1 via data bus 3 is supplied to data buffer 18 and data translation circuit 19, but as translation signal "a" goes inactive, data translation circuit 19 selects the data supplied direct from data bus 3 and supplies it to write circuit 6 of display memory 4. With the above operation, as was done in the past, writing of the required data in one of the addresses of display memory 4 which CPU 1 designates is completed by the control signals like write signal as well as the address and data outputted based on the instruction from CPU 1.

Figure 10A:
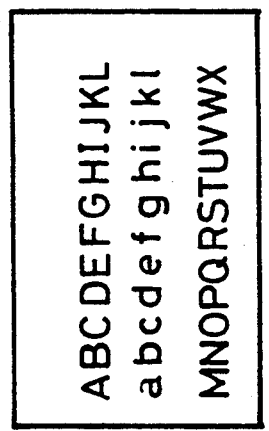
FIG. 10(a), 10(b) are diagrams illustrating a screen display rewrite example by the screen display device according to the present invention.

Next, in a case where the characters, corresponding to one line=40 characters on the screen on which characters are displayed as described above, are rewrited to have the same ones (see a first or second line of FIG. 10(a)), CPU 1 generates a block rewrite address which is not used during the normal access arranged to that one line to be rewrited and which is different from the address on display memory 4, i.e. does not exist on display memory 4, and outputs it on address bus 2. Further, CPU 1 outputs data for one line corresponding character code of the same character on data bus 3 and the data is temporarily stored in data buffer 18. Namely, although one line=40 characters are required to be displayed. CPU 1 can only outputs the data for one character as all characters are same, then make data buffer 18 store that data. In this case, as it is predetermined how the display contents are translated according to the operation or the like by users, it is also built in the programs in what conditions rewrite address is outputted to rewrite characters corresponding to one line to have the same characters (blank for erasure) and CPU 1 performs the operation as stated above based on the programs. Then, address decoder 15 decodes the address on address bus 2. In this case, address decoder 15 outputs the result of decoding to address generator 16 so as to rewrite, in a block, the data corresponding to a plurality of addresses (40 addresses) within the block corresponding to one line on the screen as said address does not exist on display memory 4. Address generator 16, when the decode result received, make translation signal "a" go active and outputs in sequence address of the corresponding blocks of display memory 4 for rewriting by using the timing signal included in the control signal "b" from CPU 1. Address translation circuit 17, once received translation signal "a", will supply the output from address generator 16 to address decoder 5 of display memory 4. And at the same time, data translation circuit 19 which received the translation signal "a" transfers to write circuit 6 of display memory 4, the output from data buffer 18 which temporarily stores the data outputted by CPU 1 to data bus 3. With the operation described above, data from data buffer 18 is sequentially written into display memory 4 in accordance with the address outputted by address generator 16. Namely, the address is incremented by one, so that data can be sequentially stored in display memory 4.

Figure 10B:
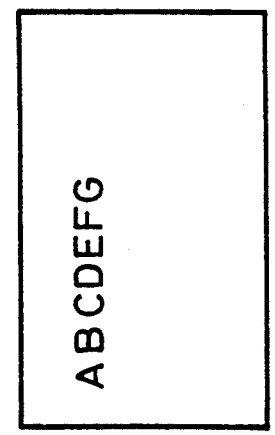

As the above operation is performed by one address, one data, it is completed by execution of one instruction by CPU 1. As shown in a third line of FIG. 10(a), if most characters are required to be the same except some in one line, it is necessary for the characters to be rewritten at first to have the same for one line as described above, and then for some characters to be rewritten as was done in the past. When all characters are also required to have the same colors for one full line as shown in FIG. 10(b), the same operation as above is applied except the change of character code into color data. A series of operation of display memory 4, font memory 9 and video signal output circuit 10 after data is stored into display memory 4 is the same as that of conventional screen display device.

Figure 2:
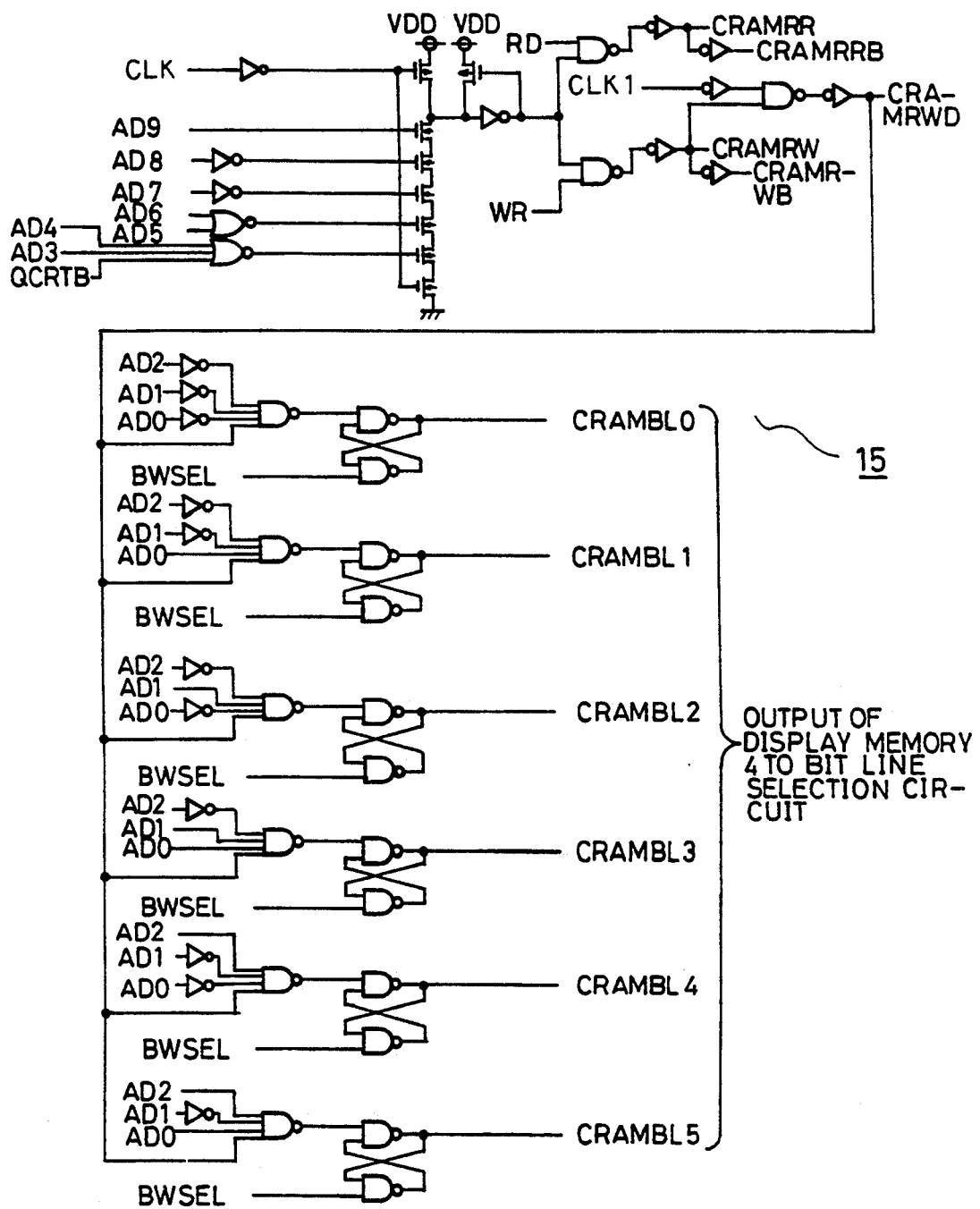
FIG. 2 is a circuit diagram illustrating an embodiment of an address decoder shown in FIG. 1.
Figure 3:
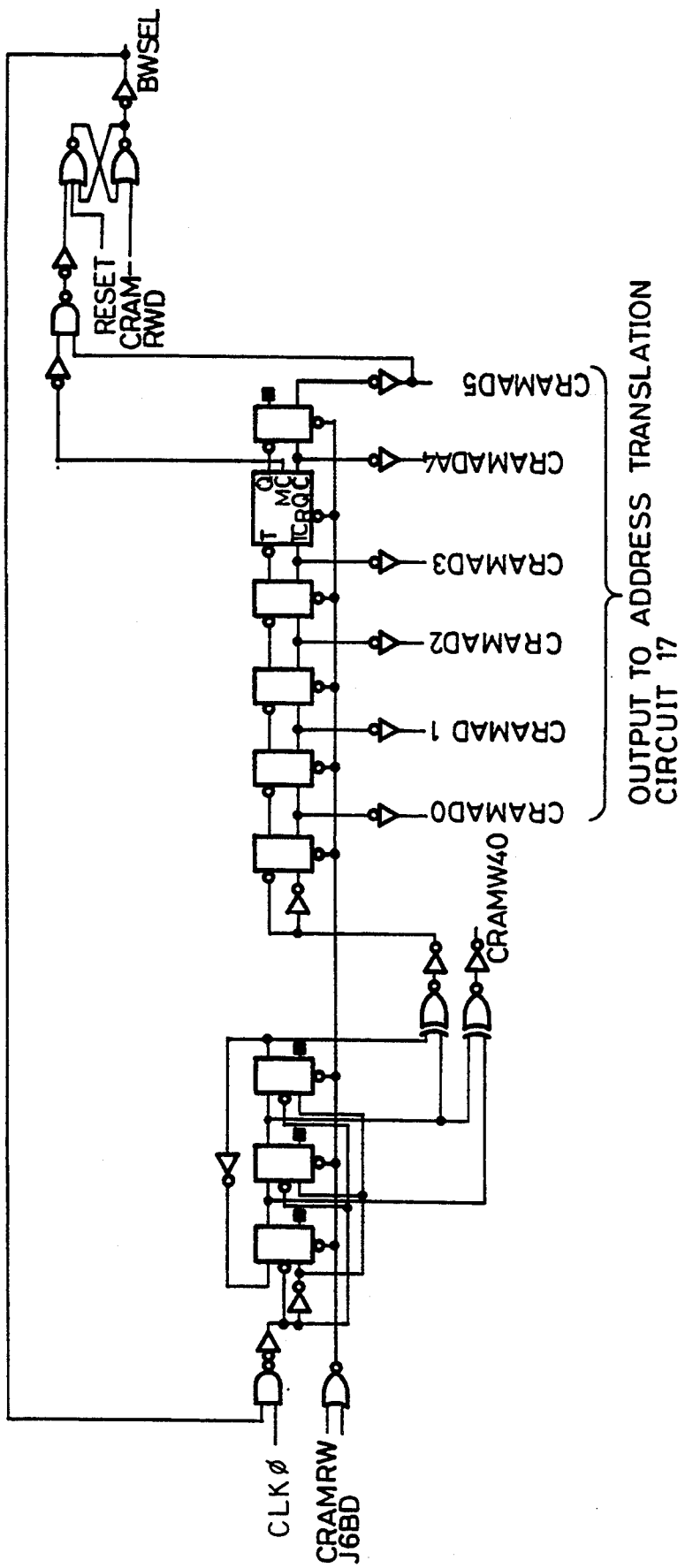
FIG. 3 is a circuit diagram illustrating an embodiment of an address generator shown in FIG. 1.
Figure 4:
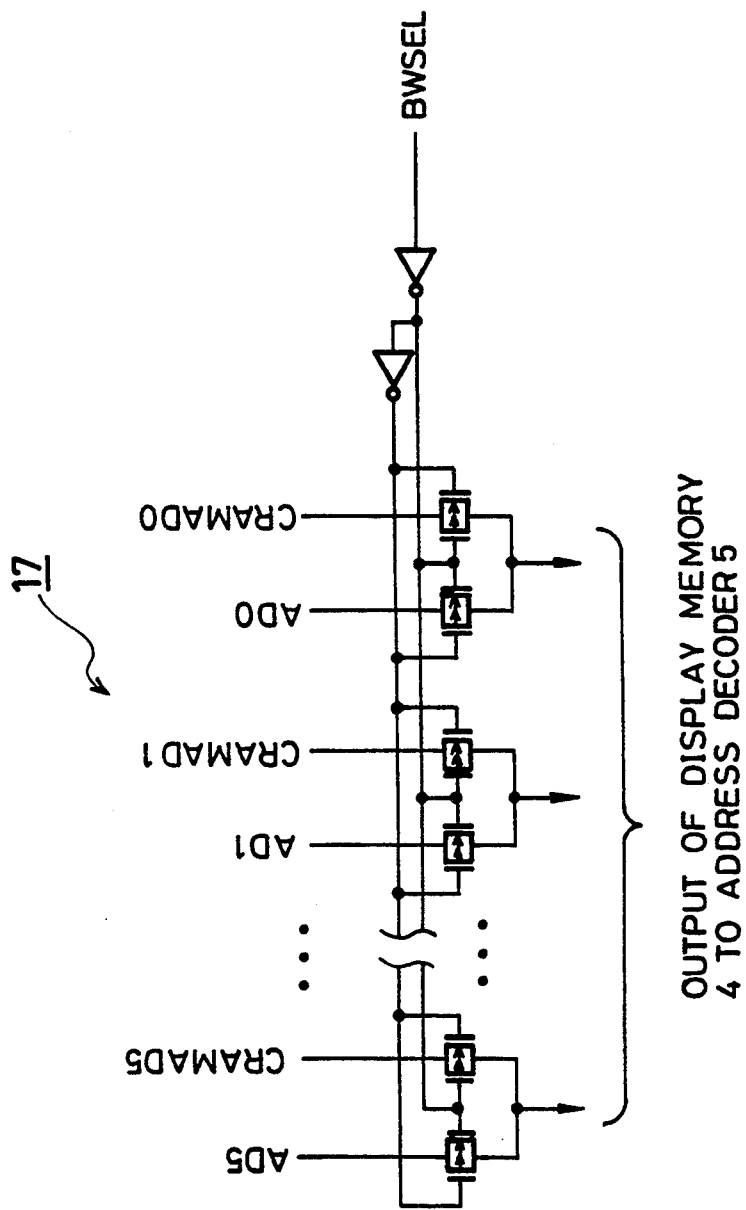
FIG. 4 is a circuit diagram illustrating an embodiment of an address translation circuit in FIG. 1.
Figure 5:
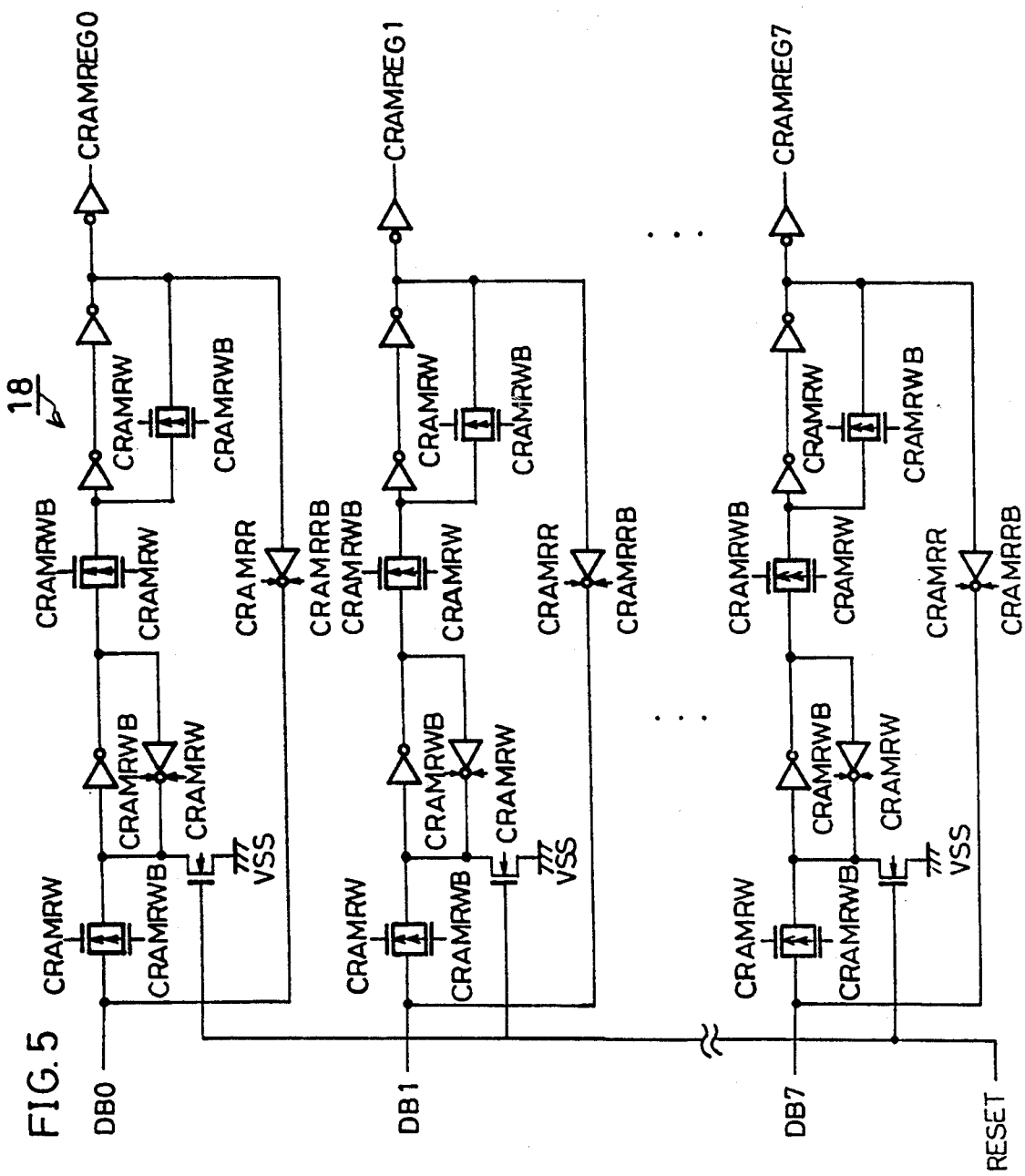
FIG. 5 is a circuit diagram illustrating an embodiment of a data buffer shown in FIG. 1.
Figure 6:
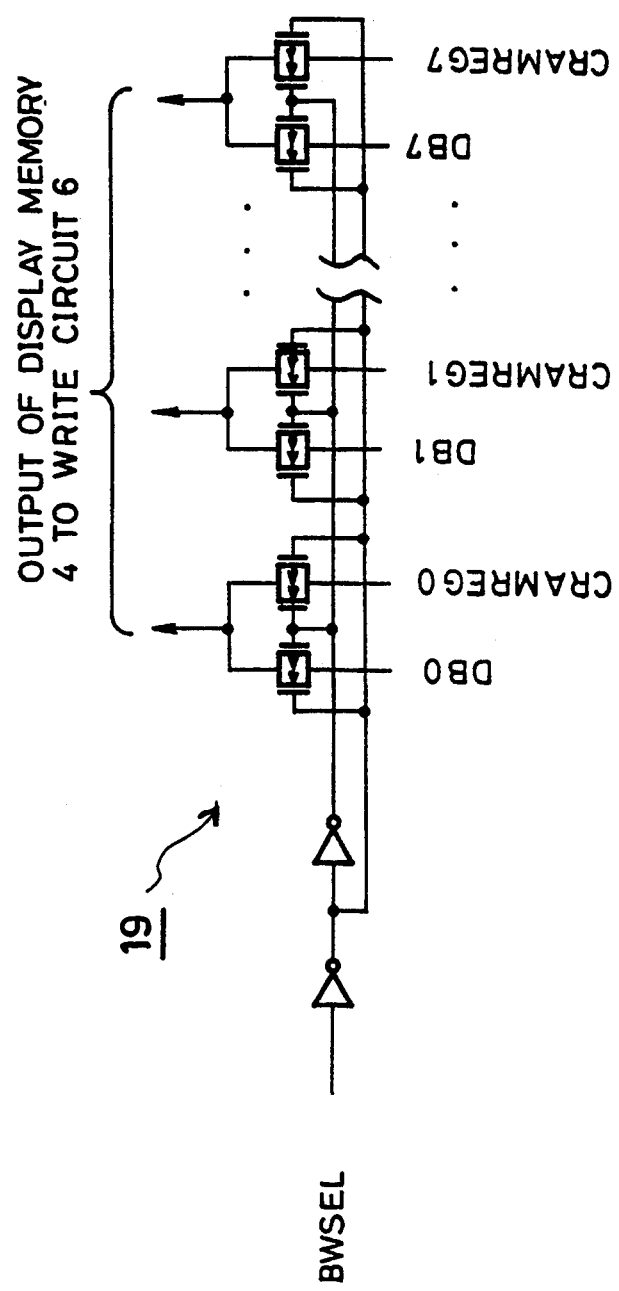
FIG. 6 is a circuit diagram illustrating an embodiment of a data translation circuit shown in FIG. 1.
Figure 9:
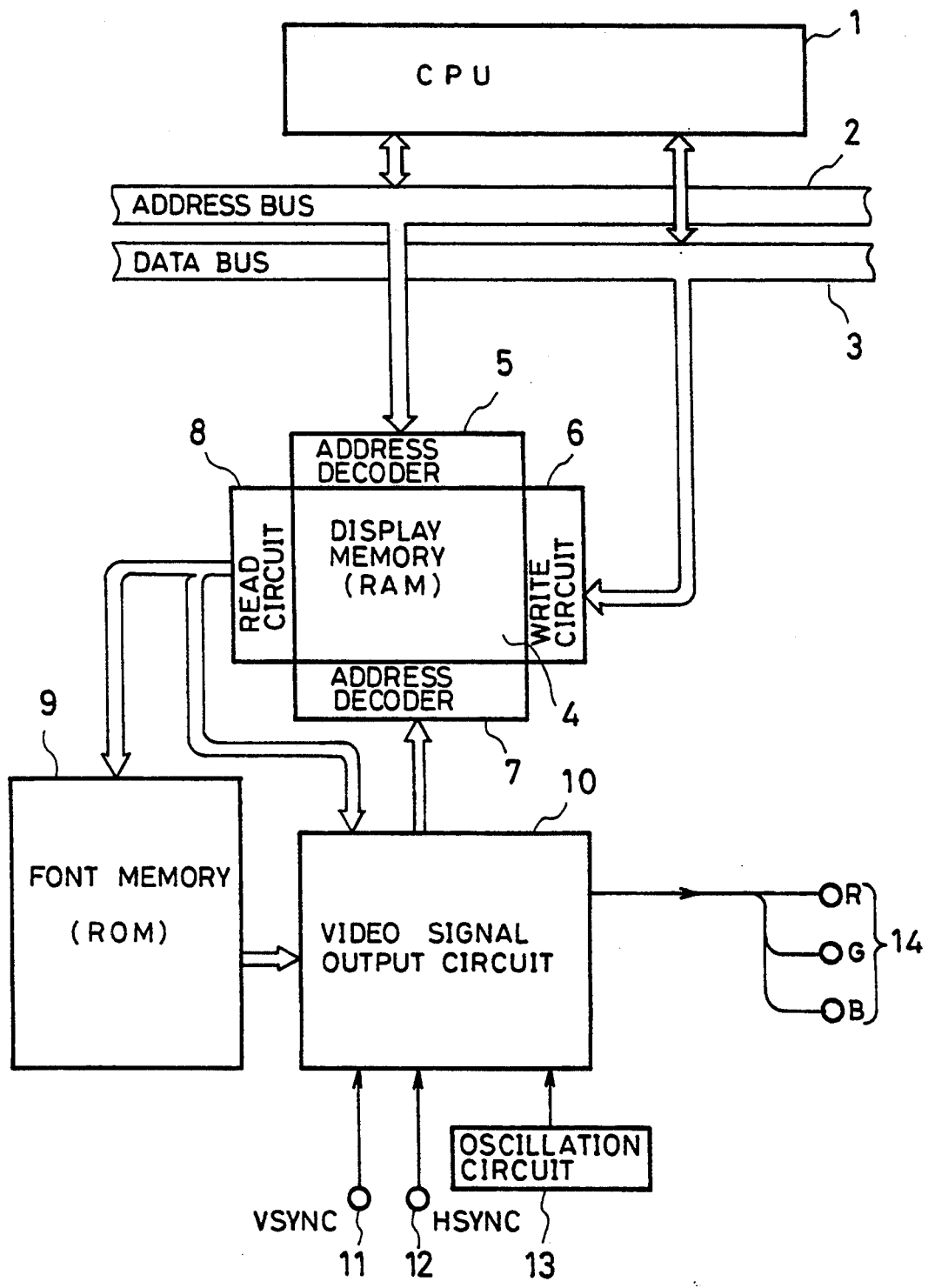
FIG. 9 is a block diagram illustrating a configuration of the conventional screen display device.

By the way, an embodiment for the components newly added to the present application is respectively illustrated in FIG. 2 (address decoder 15), FIG. 3 (address generator 16), FIG. 4 (address translation circuit 17), FIG. 5 (data buffer 18) and FIG. 6 (data translation circuit 19), and timing chart for the main signals is illustrated in FIG. 7. Although there are some signals not shown in FIG. 1, this is because FIG. 1 is a block diagram in such a level of function as described in claims, but FIGS. 2 through 6 are instantiated circuit diagrams in the level of circuit elements and are memory configurations for such a display memory as illustrated in FIG. 8 described later.

In FIG. 2 illustrating address decoder 15, AD0-AD15 (QCRTB=AD0-AD15) are address signals supplied from CPU 1 to the said address decoder 15 via address bus 2 and are 16 bits wide in this embodiment. RD is a read signal, WR is a write signal, and CLK and CLK1 are CPU timing signals, which correspond to a control signal "b" outputted from CPU 1 of FIG. 1. CRAMRR and its inverting signal CRAMRRB, CRAMRW and its inverting signal CRAMRWB are signals from control data buffer 18 and correspond to a control signal "c" of FIG. 1. Further, CRAMRWD and the said CRAMRW are address generate start signals and correspond to the decode result outputted from address decoder 15 of FIG. 1 address generator 16. On the other hand, BWSEL are translation signals from address generator 16, and CRAMBL0-CRAMBL5 are translation signals outputted to bit line selection circuit (not shown) of display memory 4 to select one block among 6 blocks. Since these translation signals and the combinational logic circuits associated therewith are not necessarily needed for the line number for screen display and the memory configuration for display memory 4, it should be noted that they are not illustrated in FIG. 1. Address decoder 15 in the present embodiment comprises: a transistor and combinational logic circuit to which high order 12-bit AD3-AD15 among the said 16-bit wide address signals AD0-AD15 (QCRTB=AD10-AD15), write signal WR, CPU timing signals CLK, CLK1 and the like are inputted, and which outputs address generate start signals CRAMRWD, CRAMRW and the like; and a combinational logic circuit to which low order 3-bit AD0-AD2 among 16-bit wide address signals, the said address generate start signal CRAMRWD, translation signal BWSEL and the like are respectively inputted, and which outputs translation signals CRAMBL0-5 to select bit line of display memory 4 in order to select one block among 6 blocks.

In addition, address generator 16 shown in FIG. 3 comprises one-shot circuit for timing generation by D flip-flop, and address counter and combinational logic circuit by T flip-flop, to which address generate start signal CRAMRWD, CRAMRW from the said address decoder 15 and CPU timing signal CLK Φ and the like are inputted, and which output translation signal BWSEL corresponding to a translation signal "a" shown in the said FIG. 1, 6-bit generated address CRAMAD0-5 and the like. Further, RESET is a reset signal and corresponds to a control signal "b" from CPU 1 together with the CPU timing signal CLK Φ. Still further, as CRAMW40 is a RAM write signal corresponding to 40 bytes to display memory 4 and outputted as the write signal as in the past, it is not illustrated in FIG. 1.

The Address translation circuit 17 shown in FIG. 4 comprises: transmission gates for outputting to address decoder 5 of display memory 4 by selecting either low order 6-bit addresses AD0-AD5 among address bus 2 or generated addresses CRAMAD0-5 from the said address generator 16; and an inverter for controlling the transmission gates by translation signal BWSEL from the said address generator 16.

In FIG. 5, data buffer 18 is composed of a latched circuit which latches 8-bit data DB0-DB7 from data bus 3 by the address generate start signal CRAMRW from the said address decoder 15 and the inverting signal CRAMRWB and the like and outputs as data buffer data CRAMREG0-7.

The data translation circuit 19 shown in FIG. 6 comprises: transmission gates for outputting to write circuit 6 of display memory 4 by selecting either 8-bit data DB0-DB7 from data bus 3 or data CRAMREG0-7 from the said data buffer 18; and an inverter for controlling the transmission gates by translation signal BWSEL from the said address generator 16.

FIG. 7 is a timing chart illustrating 40-bytes block rewrite in the present embodiment and illustrates each name of signals described above, and semantics and signal waveforms thereof.

Further, the rewriting of a plurality of addresses in the present embodiment, that is, block rewriting can be performed by dividing the addresses into 6 blocks in 40-byte unit per block. In this display memory block rewrite function, it is possible to rewrite, in block, character code for 40 characters, or color code (color data) in a block unit. FIG. 8 illustrates block rewrite address outputted from CPU 1, address of display memory 4 rewritable by writing into the block rewrite address and the contents of display memory 4 respectively. In FIG. 8, block 1, 2 and 3 indicates that number is given to a block of the memory area corresponding to each line which has 40 characters×3 lines to be displayed on the screen. Each block of 1, 2 and 3 is provided with an area for character and color code. For example, if 2200 address of block rewrite address is given from CPU 1 to address decoder 15 via address bus 2, this means that address area of 2000-2027 address of display memory 4 must be rewritten.

Now, the operation of this embodiment will be explained with reference to each of the above drawings, by way of example of rewriting 40-byte of 2000-2027 addresses among all of 2000-2167 addresses (40 bytes×6=240 bytes) of display memory 4.

When write instruction to perform the operation described above is given from CPU 1 to the block rewrite address: 2200 address of 2000-2027 address, data to be rewritten is generated on data bus 3 and "2200" 16 (16 hexadecimal) is generated on address bus 2 respectively by CPU 1. At this time, if this address is decoded by address decoder 15, address generate start signals, CRAMRW, CRAMRWB takes "1" for a short time (one shot). With this signal, translation signals, BWSEL, CRAMBL0 take "1". Translation signal BWSEL is a signal corresponding to translation signal "a" of FIG. 1 which translates data bus for 1-byte write and 40-byte block write, and CRAMBL0-5 are signals to select bit line of display memory 4 so that one block among 6 blocks can be selected.

At the same line, data DB0-DB7 on data bus 3 are stored into data buffer 18 by CRAMRW signal.

In the inside of address generator 16, when translation signal BWSEL takes "1", timing signal CLK Φ from CPU 1 is inputted into one-shot circuit consisting of D flip-flop and then, into the address counter consisting of T flip-flop and RAM write signal CRAMW40 corresponding to display memory write signal for 40 bytes and address CRAMAD0-5 are generated in sequence.

Precharge signal of display memory 4 and write signal of display memory 4 (both not shown) become timing equal to the said CRAMW40, and data of data buffer 18 are sequentially written into display memory 4 in accordance with the address (in this example, 2000-2027 address) within block indicated by address CRAMAD0-5.

Once write of 40 bytes has been completed, translation signal BWSEL becomes "0" by count signal of address generator 16 and thereafter, input of CPU timing signal CLK Φ is blocked, then count of address stops.

By changing value of AD0-AD2, it is possible to make one signal among CRAMBL0-5 become "0" so as to optionally select one block among 6 blocks.

While in the foregoing embodiments translation signal "a" of address translation circuit 17 and data translation circuit 19 has been generated from address generator 16, it will be understood that this is to hold translation signal active during generation of address. For example, it may be possible to generate translation signal from address decoder 15, and translation signal which was active during block rewriting of a plurality of characters, may be returned to go inactive when rewriting of each character in needed.

As described above, according to the present invention, as it is designed to rewrite data of a plurality of addresses within block corresponding to one line to be displayed on the screen, to have the same data, it is possible to reduce the time for rewriting into the same data by reducing the number of instructions for rewriting, to improve screen display efficiency and further to reduce load put in the software.

What is claimed is:

1. A screen display device comprising:
   a display screen for displaying one or more lines of characters;
   a display memory in which code and display color data for each character to be displayed on the display screen is stored and data is rewritten by the instruction of a processor, wherein the display memory includes one or more blocks, each block comprising sequential addresses in memory corresponding to the display of a line of characters on the display screen;
   a font memory in which font data for said character or pattern is stored and from which said font data is read out according to the character code outputted from said display memory;

an output circuit which reads out said display memory in sequence and outputs the data outputted from said font memory to the display screen;

a processor for outputting normal addresses within the display memory and block rewrite addresses outside of the display memory;

address generation means for selectively generating addresses to access a given block when activated, wherein sequential addresses for display memory locations in the given block are generated in response to a corresponding block rewrite address;

a write address control means for controlling the addressing of the display memory, wherein when an address output by the processor is a normal address within the display memory area the normal address is used to address the display memory, and when said address is a block rewrite address corresponding to a first block of the display memory area, making a translation signal go active and activating the address generation means to generate addresses to the display memory to write to locations in the first block; and a write data control means which temporarily stores write data outputted by the processor, wherein when said translation signal goes inactive the write data is sent to the display memory and wherein the temporarily stored data is sent to the display memory when the translation signal goes active.

2. A screen display device as claimed in claim 1, wherein said write address control means comprises an address decoder adapted to decode write addresses from the processor; wherein the address generation means includes an address generator generating a translation signal and a plurality of write addresses within the block of the display memory according to the result of decoding from the address decoder; wherein the write address control means further comprises an address translation circuit which sends said write address from the processor directly to said address decoder of the display memory when said translation signal goes inactive, and sends write addresses generated from said address generator to said address decoder of the display memory when said translation circuit goes active.

3. A screen display device as claimed in claim 1, wherein said write data control means comprises: a data buffer adapted to temporarily store write data from the processor; and a data translation circuit which sends said write data from the processor direct to write circuit of the display memory when the given translation signal goes inactive, and sends the data stored in said data buffer to said write circuit of the display memory when the translation signal goes active.

4. A screen display device as claimed in claim 2, further comprising the address decoder outputting an address generate start signal to the address generator;

wherein the address generator comprises: a D flip-flop having an input and an output, wherein the input of the D flip-flop is coupled to the address generate start signal and the output is used to generate the translation signal; an address counter including one or more T flip-flops wherein the T flip-flops are reset by a signal derived from the address generate start signal and wherein the outputs of one or more T flip-flops are coupled to the address translation circuit; and combinational logic circuitry.

5. A screen display device as claimed in claim 2, wherein an address translation circuit of write address control means comprises: transmission gates for outputting to address decoder of the display memory by selecting either address from address bus or generated address from address generator; and inverter for controlling the transmission gates by said translation signal from said address generator.

6. A screen display device as claimed in claim 3, wherein data translation circuit of write data control means comprises: transmission gates for outputting to write circuit of display memory by selecting either data from data bus or data from data buffer; and inverter for controlling the transmission gates by the given translation signal.

* * * * *